(12) United States Patent
Biskeborn et al.

(10) Patent No.: US 7,961,430 B2
(45) Date of Patent: Jun. 14, 2011

(54) TAPE PATH CONTROL SYSTEM WITH PRECISION-ALIGNED CONJUGATED ROLLERS

(75) Inventors: Robert G. Biskeborn, Hollister, CA (US); Wayne I. Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 11/533,002

(22) Filed: Sep. 19, 2006

(65) Prior Publication Data

US 2008/0068753 A1    Mar. 20, 2008

(51) Int. Cl.
G11B 15/60    (2006.01)

(52) U.S. Cl. ..................................... 360/130.21; 360/90

(58) Field of Classification Search .................. 226/179, 226/180; 242/346.1–346.2, 397.3, 615.21; 360/96.3, 96.61, 130.21, 130.24, 291.2–291.3, 360/90, 95, 96.1, 130.22
See application file for complete search history.

(56) References Cited

U.S. PATENT DOCUMENTS

| | | | | |
|---|---|---|---|---|
| 3,686,433 | A | * | 8/1972 | Camras ............................ 360/94 |
| 3,725,829 | A | * | 4/1973 | Brown ............................ 333/33 |
| 3,918,093 | A | * | 11/1975 | Seale-Finch ................. 360/96.3 |
| 4,122,504 | A | * | 10/1978 | Prozzo et al. .................... 360/90 |
| 4,227,636 | A | * | 10/1980 | Rahmfeld et al. ............. 226/189 |
| 4,238,088 | A | * | 12/1980 | Schoettle et al. .......... 242/352.3 |
| 4,474,342 | A | * | 10/1984 | Nater .......................... 242/343.2 |
| 4,638,392 | A | * | 1/1987 | Akutsu ..................... 360/130.32 |
| 4,694,983 | A | | 9/1987 | Suzuki |
| 4,913,328 | A | * | 4/1990 | Schulz ............................. 226/21 |
| 5,160,078 | A | | 11/1992 | Spicer |
| 5,373,982 | A | | 12/1994 | Takahashi |
| 5,407,117 | A | * | 4/1995 | Yokoo et al. .................. 226/190 |
| 5,414,585 | A | * | 5/1995 | Saliba ...................... 360/130.21 |
| 5,626,273 | A | * | 5/1997 | Fell .............................. 242/615.2 |
| 5,695,709 | A | * | 12/1997 | Van Erden et al. ........... 264/476 |
| 5,803,335 | A | | 9/1998 | Lee |
| 5,833,125 | A | | 11/1998 | Shin |
| 6,073,826 | A | * | 6/2000 | Nagasaki et al. ............. 226/180 |
| 6,141,184 | A | * | 10/2000 | Daly ........................ 360/130.21 |
| 6,155,509 | A | * | 12/2000 | d'Alayer de Costemore d'Arc et al. .............................. 242/336 |
| 6,398,095 | B1 | * | 6/2002 | Tatsumi et al. ............... 226/180 |
| 6,609,645 | B1 | | 8/2003 | Groel et al. |
| 6,633,449 | B1 | * | 10/2003 | Anderson et al. ............... 360/71 |

(Continued)

FOREIGN PATENT DOCUMENTS

JP  58-012159  1/1983
JP  01317260 A  * 12/1989

Primary Examiner — Craig A. Renner
Assistant Examiner — Carlos E. Garcia
(74) Attorney, Agent, or Firm — Walter W. Duft

(57) ABSTRACT

A tape path control system and related method for controlling the position of a tape medium in the tape drive. The tape path includes a first tape guide roller, a second tape guide roller spaced from the first roller, and a transducing head situated between the first and second rollers. The first and second rollers may be large and closely spaced, with the second tape guide roller being spaced from the first roller at a roller diameter/center-to-center spacing ratio of between approximately 1:1-1:2 while still accommodating the transducing head therebetween. A precision alignment system is associated with the second roller. When operable, the precision alignment system allows the second roller to be adjustably aligned relative to the first roller in order to control lateral tape movement when a tape medium streams across the rollers in operative engagement with the transducing head.

16 Claims, 8 Drawing Sheets

U.S. PATENT DOCUMENTS

| | | |
|---|---|---|
| 6,648,200 B2 | 11/2003 | Huetter |
| 6,754,033 B1 | 6/2004 | Argumedo et al. |
| 6,831,801 B2 * | 12/2004 | Chliwnyj et al. ............... 360/71 |
| 2003/0048583 A1 * | 3/2003 | Tanaka .................... 360/130.21 |
| 2005/0207062 A1 | 9/2005 | Johnson |
| 2006/0027693 A1 * | 2/2006 | Johnson et al. ............... 242/346 |

* cited by examiner

TAPE PATH CONTROL SYSTEM WITH PRECISION-ALIGNED CONJUGATED ROLLERS

BACKGROUND OF THE INVENTION

1. Field of the Invention

This invention relates to tape drive data storage systems. More particularly, the invention is directed to controlling the path of a streaming tape medium relative to the tape drive transducing elements that read and write data on the tape.

2. Description of the Prior Art

By way of background, during the operation of a tape drive data storage apparatus, a tape medium is transferred back and forth between supply and take-up reels while data is read from or written to tape by one or more read/write heads. Typically, the tape medium and the supply reel are mounted inside a tape cartridge that is inserted into a slot in the tape drive. When the tape cartridge is situated in its operational position within the slot, a tape feed mechanism advances the tape onto the take up reel (which is typically within the tape drive) and into registered engagement with the read/write heads. The tape is then advanced past the read/write head(s) by means of a pair of motors, one for each reel, which drive the reels at a desired tape speed.

For optimum data transfer, the tape must be precisely moved through the tape path and across the read/write heads. As such, modern tape drives typically implement tape guides to guide the tape at a desired wrap angle around the heads. FIG. 1 is illustrative. It shows a tape medium "T" spooling in a feed direction "D" over a read/write head assembly "H" between a supply reel "SR" and a take-up reel "TR". Two primary tape guides, shown as roller bearings (rollers) "R1," are disposed in close proximity to the head assembly "H," one on each side thereof. Other tape path guide components, such as secondary rollers "R2," may also be disposed between the head assembly "H" and the supply and take-up reels "SR" and "TR" to define the tape path.

As can be seen in FIG. 2, data is written by the head assembly "H" onto the tape "T" as a set of parallel tracks that extend longitudinally in the direction of tape movement "D." The read/write transducers of the head assembly "H" are situated in a central transducing area of the head assembly "H." This transducer area (labeled "TA") is shown in FIG. 2 as it transduces several parallel data tracks on the tape "T." Because the length of the transducing area "TA" is typically substantially less than the width of the tape "T," the head assembly "H" must be stepped across the tape "T" during drive operation in order to fill all of the available data tracks on the tape with data. This head assembly positioning is performed by a servo actuation system "SAS" that comprises positioning motors for moving the head assembly in a cross-track direction. Servo inputs are typically provided by a pair of servo readers on the head assembly "H" that sense prerecorded servo tracks (not shown) on tape "T."

For best performance, lateral motion of the tape (transverse to the direction of tape travel) should be minimized because such movement can lead to unreliable positioning of the tape "T" relative to the head assembly read/write transducers. This can produce low readback signal amplitude and poor data transfer reliability. Events that may produce lateral tape motion include (1) tape runout caused by poor stacking on the reels (stack shifts or stagger wraps), wherein one wrap of the tape "T" is substantially laterally offset with respect to adjacent wraps, (2) a buckled tape edge caused by the edge of the tape "T" crawling against a guide roller flange and then shifting laterally back to a normal position, (3) a damaged edge of the tape that causes the tape to flick laterally when contacting a guide roller, and (4) a roller flange that has become scalloped from tape wear, causing the tape to cyclically flick laterally as the tape edge contacts the scalloped area.

Although the tape drive servo actuation system "SAS" is capable of compensating for some lateral tape motion, it cannot handle transient lateral movements that are beyond the servo response capabilities of the system. That is to say, there are some lateral transients that are simply too fast or too large for the servo actuation system "SAS," such that data read/write errors cannot be avoided. This imposes an artificial limit on data areal densities insofar as data tracks must be sufficient spaced from each other to avoid cross-track overwrites in the event that lateral transients occur during data write operations.

Attempts have been made to constrain lateral tape movement by constructing tape guide rollers with friction enhancing surface properties that limit lateral tape movement by gripping the tape with increased frictional force. Although such solutions have resulted in considerable improvement in lateral tape movement control, it is submitted that additional tape path control may be achieved by considering other guide roller design characteristics.

Accordingly, it is desired to provide an improved design for controlling a tape path in a tape drive data storage system. What is particularly needed is a technique for limiting lateral tape movement by considering the shape, size and alignment of tape path guide rollers as a further solution to preventing tape misalignment problems.

SUMMARY OF THE INVENTION

The foregoing problems are solved and an advance in the art is obtained by a tape path control system and related method for controlling the position of a tape medium in the tape drive. The tape path includes a first tape guide roller, a second tape guide roller spaced from the first roller, and a transducing head situated between the first and second rollers. The first and second rollers may be large and closely spaced, with the second tape guide roller being spaced from the first roller at a roller diameter/center-to-center spacing ratio of between approximately 1:1-1:2 while still accommodating the transducing head therebetween. The transducing head may be positioned to lie on an opposite side of the tape medium from the first and second guide rollers, or on the same side of the tape. A precision alignment system is associated with the second roller. When operable, the precision alignment system allows the second roller to be adjustably aligned relative to the first roller in order to control lateral tape movement when a tape medium streams across the rollers in operative engagement with the transducing head.

The precision alignment system may include an axial adjustment control adapted to adjust a position of the second roller along an axis thereof. The axial adjustment control may engage the base end of a bearing shaft on the second roller, such as by way of a set screw that is adjustably threaded or otherwise adjustably mounted relative to a fixed reference structure. The set screw may be axially aligned with the bearing shaft and may engage an end face of the bearing shaft, such that the second roller is tiltable about the set screw.

The precision alignment system may further include a tilt angle adjustment control adapted to adjust a tilt angle of the second roller. The tilt angle adjustment control may engage a free terminal end of a bearing shaft on the second roller, with a base end of the bearing shaft being pivotally mounted. The tilt angle adjustment control may include one or more set screws that are adjustably threaded or otherwise adjustably mounted relative to a fixed reference structure, with the set screw(s) being aligned to engage a side portion of the bearing shaft's free terminal end. The one or more set screws may extend parallel or perpendicular to the bearing shaft and may have tapered or flat ends that adjustably engage the side of the bearing shaft according to a set screw adjustment position.

According to the inventive method, the second roller may be adjustably aligned relative to the first roller in order to control lateral tape movement when a tape medium streams across the rollers in operative engagement with the transducing head. A precision alignment system may be used to provide the desired adjustments. Once the required adjustments are made, the second roller may be permanently fixed in the alignment position or may remain dynamically adjustable during use.

BRIEF DESCRIPTION OF THE DRAWINGS

The foregoing and other features and advantages of the invention will be apparent from the following more particular description of preferred embodiments of the invention, as illustrated in the accompanying Drawings, in which.

DETAILED DESCRIPTION OF EXEMPLARY EMBODIMENTS

Figure 1:
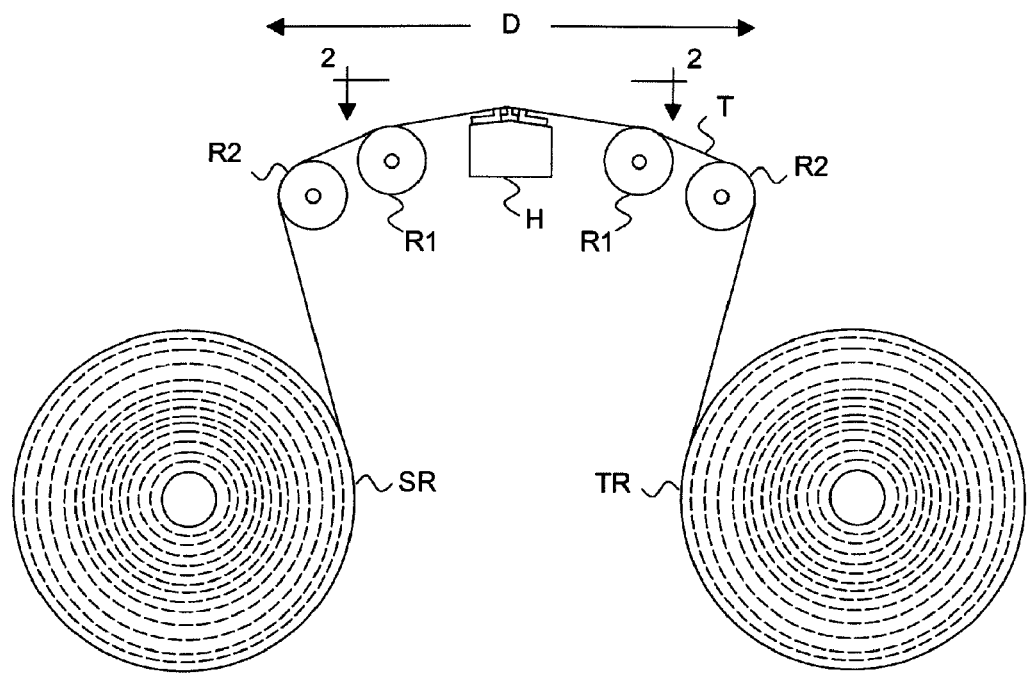
FIG. 1 is a schematic plan view of a tape feed path in a prior art magnetic tape data storage system.
Figure 2:
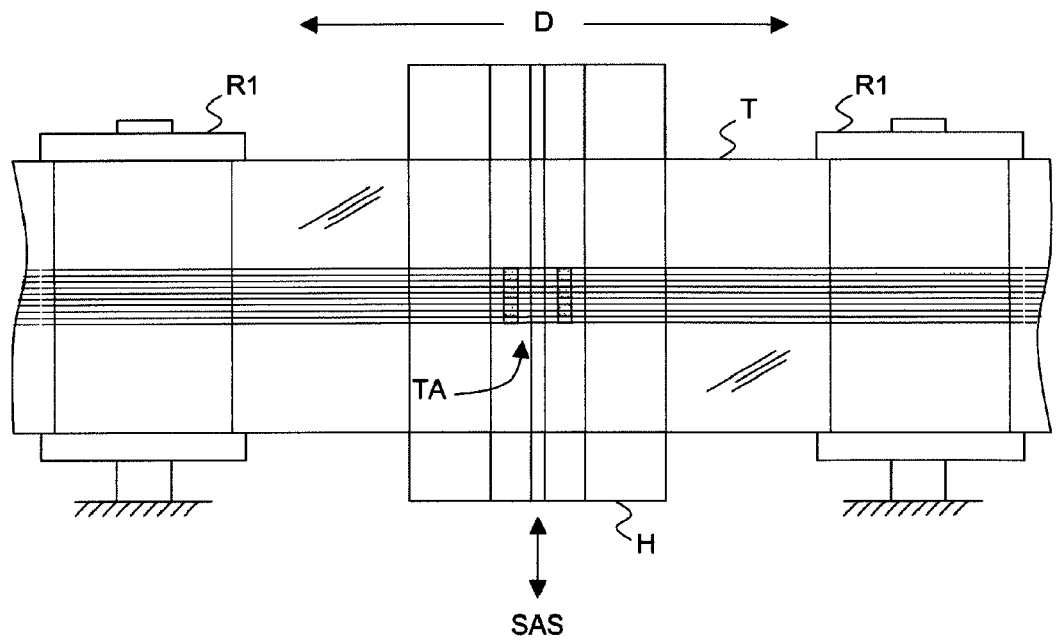
FIG. 2 is an enlarged side elevation view of a tape medium engaging a head assembly and a pair of primary guide rollers in the data storage system of FIG. 1.

The invention will now be described by way of exemplary embodiments shown by the drawing figures (which are not necessarily to scale), in which like reference numerals indicate like elements in all of the several views.

Figure 3:
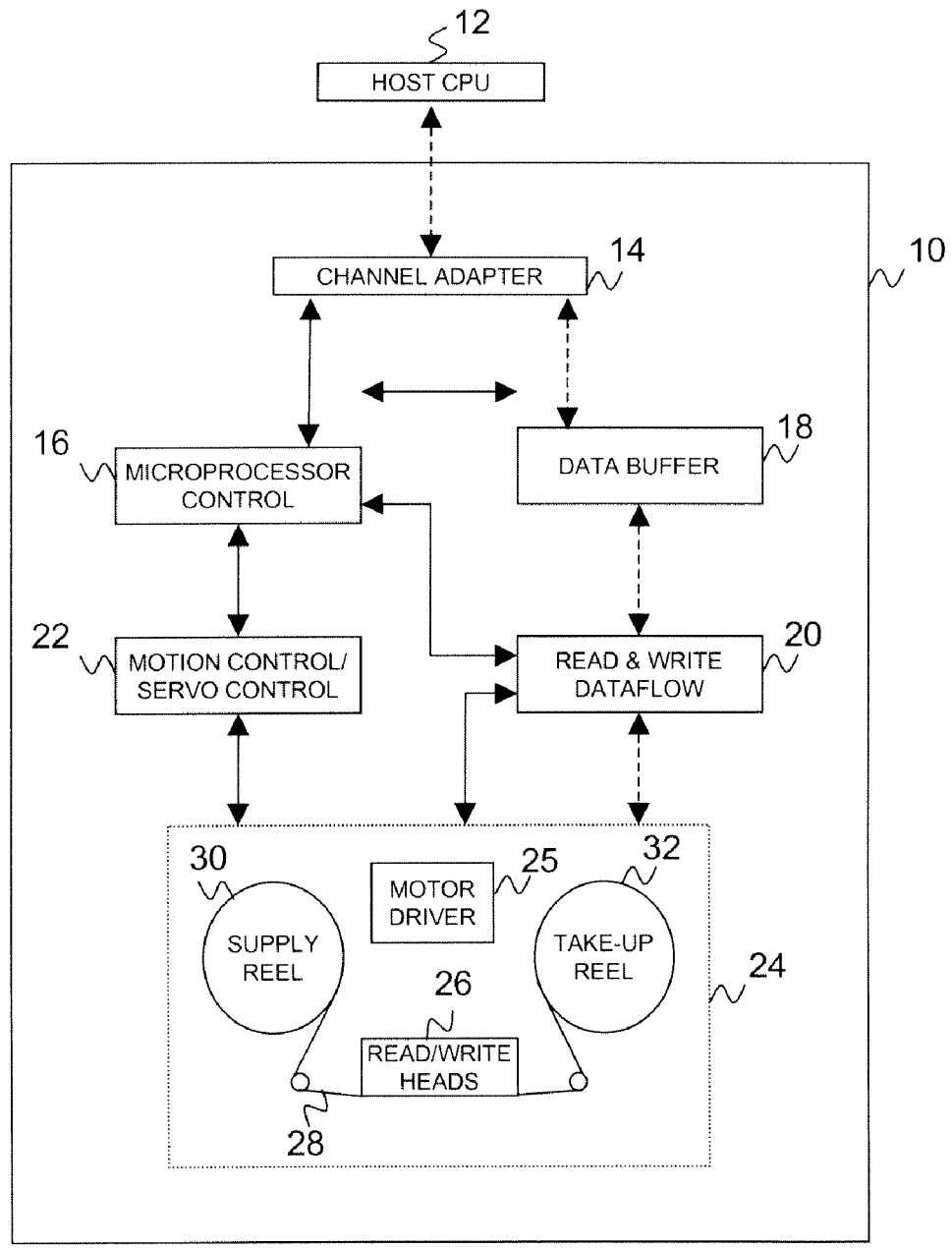
FIG. 3 is a functional block diagram showing an exemplary tape drive data storage device.

Turning to FIG. 3, the inventive concepts herein described may be embodied in a tape drive data storage device (tape drive) 10 for storing and retrieving data by a host data processing device 12, which could be a general purpose computer or other processing apparatus adapted for data exchange with the tape drive 10. The tape drive 10 includes plural components providing a control and data transfer system for reading and writing host data on a magnetic tape medium. By way of example only, those components may conventionally include a channel adapter 14, a microprocessor controller 16, a data buffer 18, a read/write data flow circuit 20, a motion control system 22, and a tape interface system 24 that includes a motor driver circuit 25 and a read/write head unit 26.

The microprocessor controller 16 provides overhead control functionality for the operations of all other components of the tape drive 10. As is conventional, the functions performed by the microprocessor controller 16 are programmable via microcode routines (not shown) according to desired tape drive operational characteristics. During data write operations (with all dataflow being reversed for data read operations), the microprocessor controller 16 activates the channel adapter 14 to perform the required host interface protocol for receiving an information data block. The channel adapter 14 communicates the data block to the data buffer 18 that stores the data for subsequent read/write processing. The data buffer 18 in turn communicates the data block received from the channel adapter 14 to the read/write dataflow circuitry 20, which formats the device data into physically formatted data that may be recorded on a magnetic tape medium. The read/write dataflow circuitry 20 is responsible for executing all read/write data transfer operations under the control of the microprocessor controller 16. Formatted physical data from the read/write circuitry 20 is communicated to the tape interface system 24. The latter includes one or more read/write heads in the read/write head unit 26, and drive motor components (not shown) for performing forward and reverse movement of a tape medium 28 mounted on a supply reel 30 and a take-up reel 32. The drive components of the tape interface system 24 are controlled by the motion control system 22 and the motor driver circuit 25 to execute such tape movements as forward and reverse recording and playback, rewind and other tape motion functions. In addition, in multi-track tape drive systems, the motion control system 22 transversely positions the read/write heads relative to the direction of longitudinal tape movement in order to record data in a plurality of tracks.

Figure 4:
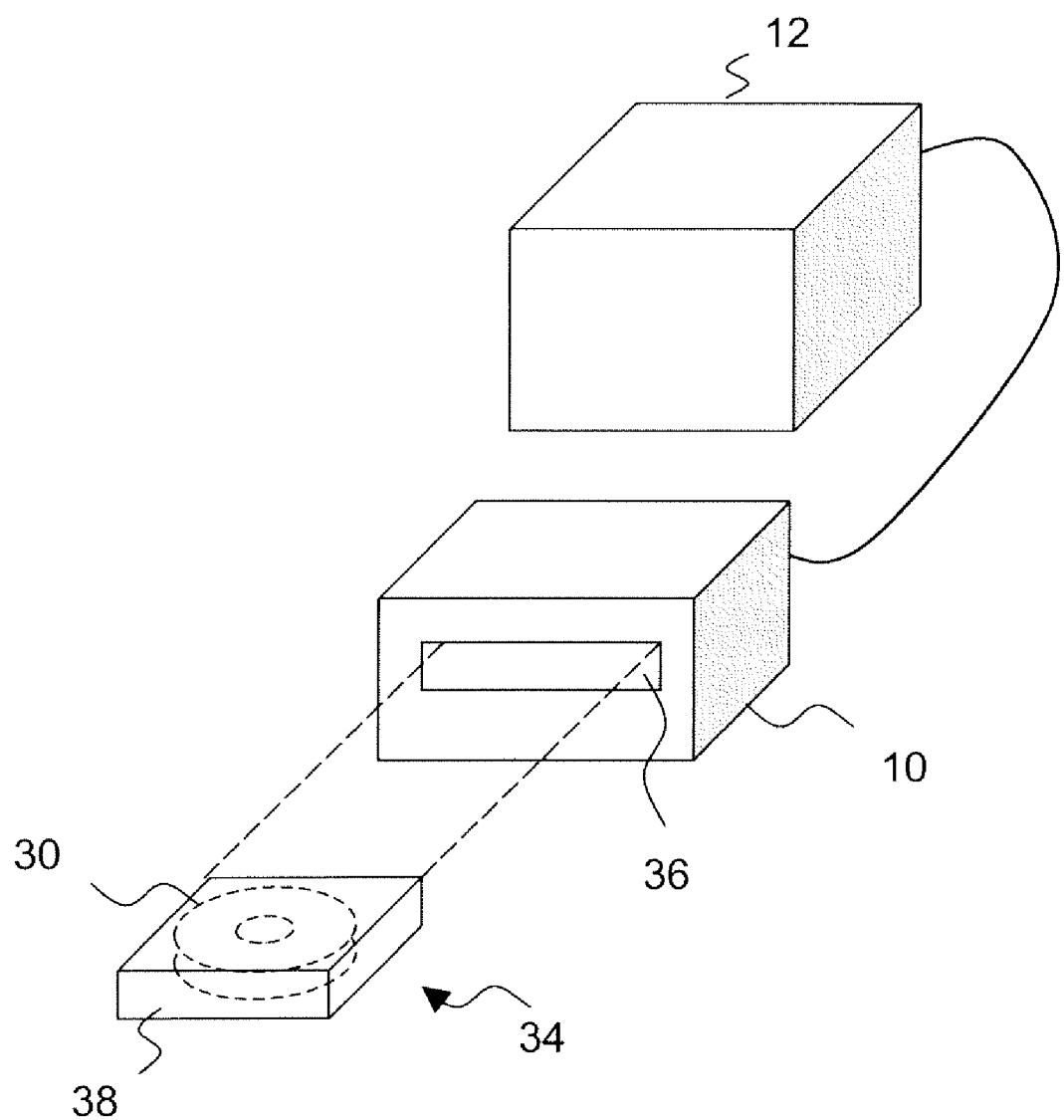
FIG. 4 is a perspective view showing an exemplary construction of the tape drive storage device of FIG. 3 for use with cartridge-based tape media.

In most cases, as shown in FIG. 4, the tape medium 28 will be mounted in a cartridge 34 that is inserted in the tape drive 10 via a slot 36 in the tape drive 10. The tape cartridge 34 comprises a housing 38 containing the magnetic tape 28. The supply reel 30 is shown to be mounted in the housing 38.

Figure 5:
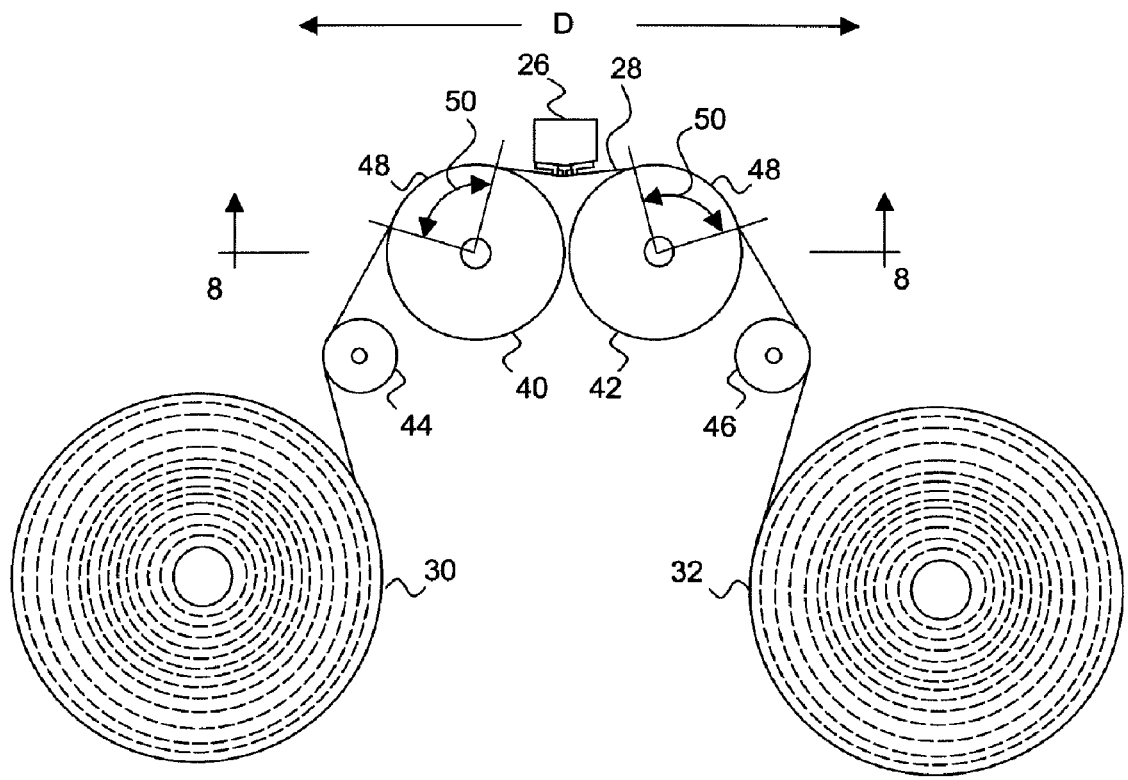
FIG. 5 is a schematic plan view of an exemplary tape feed path in the tape drive data storage system of FIG. 3.

Referring now to FIG. 5, when the tape cartridge 34 is situated in its operational position within the tape drive 10, the tape medium 28 is brought into registered engagement with the read/write head unit 26 so that the tape is able to stream longitudinally over the face of the latter's read/write transducing elements. The mechanism used to register the tape medium 28 in the required position is of conventional design, and will therefore not be described in further detail in the interest of brevity. Suffice it to say that the registration operation will also place the surface of the tape medium 28 in contact with a pair of primary tape guide rollers 40 and 42, the former being situated between the read/write head unit 26 and the supply reel 30, and the latter being situated between the read/write head unit 26 and the take-up reel 32. Other tape path elements, such as a pair of secondary guide rollers 44 and 46 may also be situated in the tape path.

Figure 6:
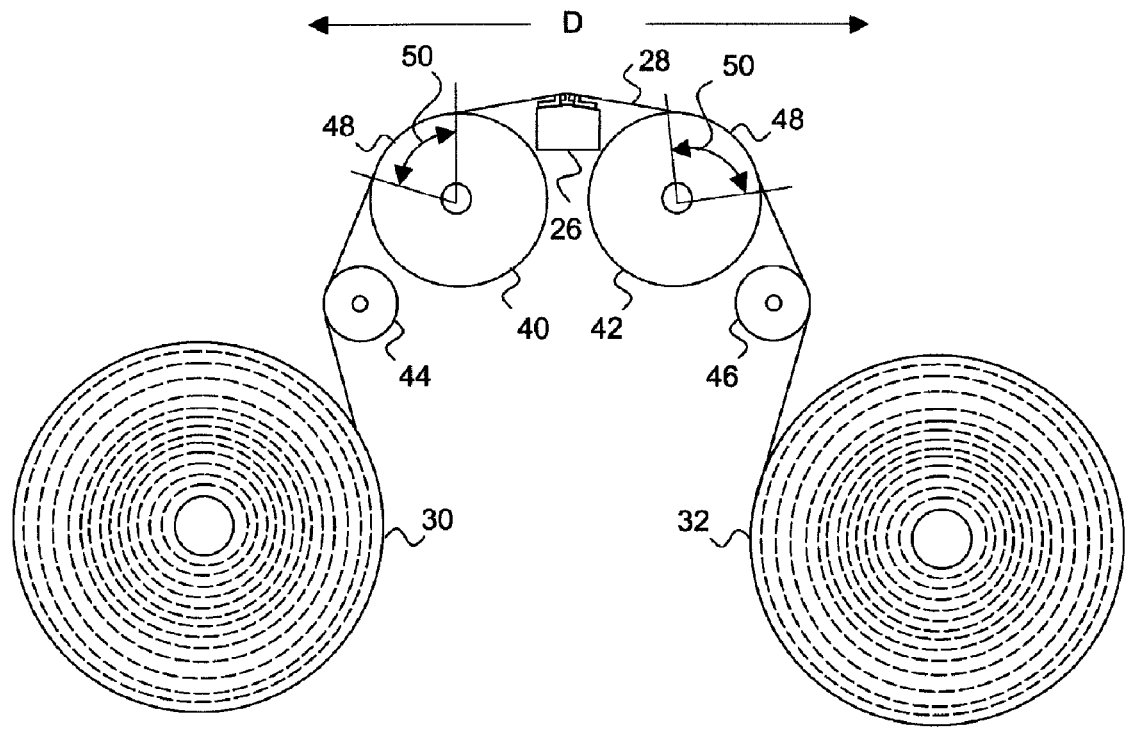
FIG. 6 is a schematic plan view of an alternative tape feed path in the tape drive data storage system of FIG. 3.

In FIG. 5, the read/write head unit 26 is aligned with the transducing elements thereof facing the primary rollers 40 and 42. In this construction, the data side of the tape medium 28 contacts the read/write head unit 26 while the back or non-data side of the tape medium contacts the rollers 40/42 and 44/46. Because the back side of the tape medium 28 is typically rougher than the data side, improved gripping will be provided between the tape medium and the rollers 40/42 and 44/46. FIG. 6 illustrates an alternative construction in which the read/write head unit 26 is aligned with the transducing elements thereof facing away from the primary rollers 40 and 42. In this construction, the data side of the tape medium contacts the read/write head unit 26 and also the rollers 40/42 and 44/46.

As an optional construction feature, the primary guide rollers 40 and 42 may be substantially larger and more closely spaced than conventional primary guide rollers, such as the rollers R1 shown in FIG. 1. Whereas the rollers R1 may have a conventional diameter of 10 mm and center-to-center spacing of 40 mm, the primary rollers 40 and 42 may have a diameter of approximately 20-30 mm and a center-to-center spacing that allows the rollers to be placed as closely as the read/write head unit 26 or the rollers themselves will allow.

In the construction of FIG. 5, the positioning of the read/write head unit 26 on the opposite side of the tape medium 28 allows the primary roller spacing to be minimized to its lowest possible value. In this construction, the primary rollers 40 and 42 may be placed in nearly contacting relationship. By way of example only, a 1 mm separation gap could be used, with the gap being measured along a line extending between the rotational axis of each roller and representing the distance that separates the roller outside diameters along this line. In that case, if the primary rollers 40 and 42 have a diameter of approximately 20-30 mm, the center-to-center spacing might range from 21.1-30.1 mm. The ratio of the roller diameter to the center-to-center spacing will thus be approximately 1:1.

For the construction of FIG. 6, the spacing of the primary rollers 40 and 42 may need to be larger, unless the read/write head unit 26 is moved away from the rollers, in which case the roller spacing may be reduced. However, the tape wrap angle across the read/write head unit 26 will increase. In FIG. 6, if the primary rollers 40 and 42 have a diameter of approximately 20-30 mm, a 10 mm separation gap may need to be formed between the rollers, as measured along a line extending between the rotational axis of each roller. In that case, the center-to-center spacing might range from 30-40 mm. The ratio of the roller diameter to the center-to-center spacing will thus be approximately 1:1.5. In most cases, the roller diameter/center-to-center spacing ratio should not need to exceed 1:2.

The advantage of using large and closely spaced primary rollers is that there is more control over tape lateral movement than is achieved using conventional roller designs. Due to their large diameter, the primary rollers 40 and 42 will have a lower angular velocity so that any defects in the roller tape-bearing surface will perturb the tape medium 28 more gradually than if the angular velocity was high, thereby increasing the time that the tape drive servo actuation system has to respond to the perturbation. The larger diameter of the primary rollers 40 and 42 also provides a larger tape contact area and thus increases the tape/roller friction. As can be seen in FIGS. 5 and 6, the rollers 40/42 each have an increased tape contact area 48, with the tape contact area of FIG. 5 being somewhat larger than the tape contact area of the FIG. 6. In both FIGS. 5 and 6, the tape contact area represents the circumferential distance that is scribed by the arc 50. The tape contact area 48 is a function of the diameter of the rollers 40/42 and is thus larger than the tape contact area provided by the smaller diameter rollers R1 of FIG. 1. The close spacing between the primary rollers 40/42 also improves control over lateral tape motion because reducing the length of the tape span between the rollers increases the tape span stiffness and lowers the amount of lateral deflection that is possible within the span. Additional lateral stability may be achieved by situating the secondary rollers 44 and 46, together with other tape path components such as fixed posts and rollers, relatively far from the primary rollers 40 and 42 and closer to the tape reels 30 and 32. This will provide a long tape span between the primary rollers 40/42 and these other tape path components, which is preferable for minimizing the impact on the tape attack angle made by the tape medium 28 as it wraps around the primary rollers.

The tape contacting portions of the primary rollers 40 and 42 may have conventional surface features. Such features may include grooves, apertures and vent configurations for preventing the formation of an air bearing, and coatings, roughness enhancers, and gripping elements for increasing friction. The primary roller 40 and 42 may also have flanges for guiding the tape edges, or they may be unflanged.

Figure 7A:
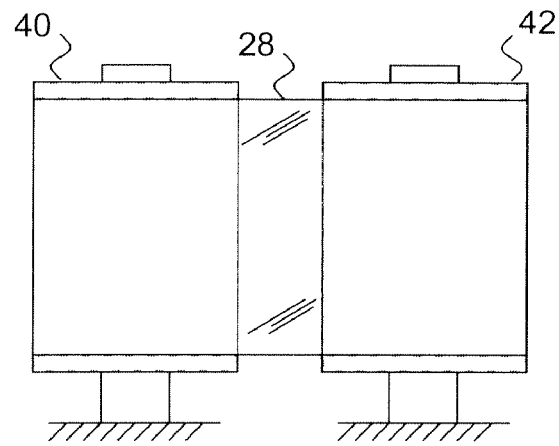
FIG. 7A is a side elevational view showing a pair of primary guide rollers situated in an ideal alignment position.
Figure 7B:
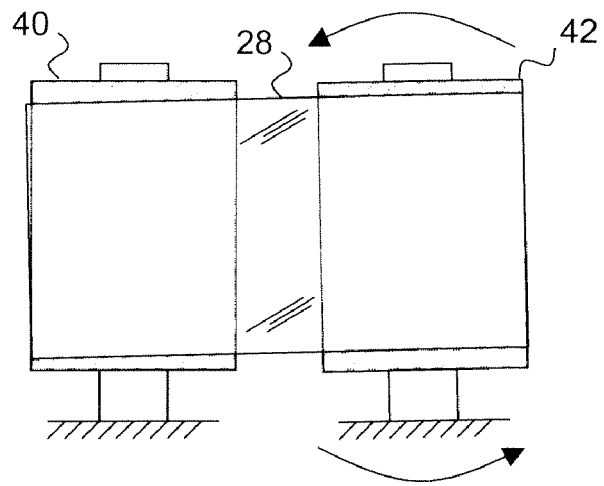
FIG. 7B is a side elevational view showing a pair of primary guide rollers that are misaligned due to one of the rollers being canted in a counterclockwise direction.
Figure 7C:
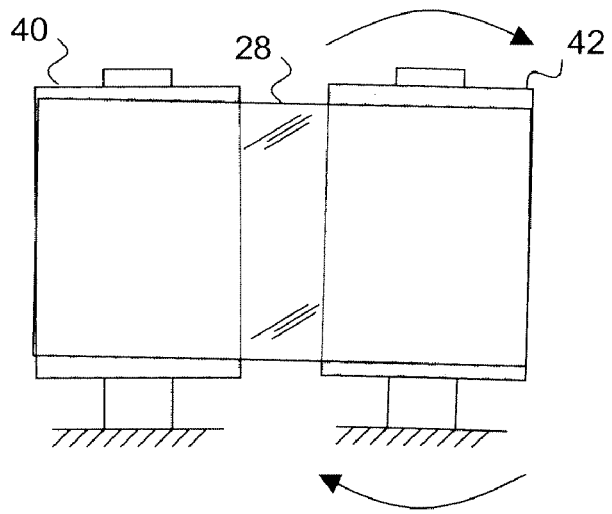
FIG. 7C is a side elevational view showing a pair of primary guide rollers that are misaligned due to one of the rollers being canted in a clockwise direction.

Turning now to FIGS. 7A, 7B and 7C, additional tape path control may be achieved by controlling the relative alignment between the primary rollers 40 and 42. FIG. 7A illustrates an ideal alignment configuration wherein the primary rollers 40 and 42 are perfectly aligned such that their respective rotational axes are parallel and the rollers are at the same height relative to a common reference surface. FIG. 7B illustrates a condition wherein the primary roller 42 is canted counter-clockwise relative to the primary roller 40. With this condition, the angle of attack of the tape medium 28 relative to the primary rollers 40/42 is changed. In particular, the tape medium 28 has a tendency to climb when moving from the primary roller 40 to the primary roller 42. FIG. 7C illustrates a condition wherein the primary roller 42 is canted clockwise relative to the primary roller 40. With this condition, the angle of attack of the tape medium 28 relative to the primary rollers 40/42 is again changed. In particular, the tape medium 28 has a tendency to climb when moving from the primary roller 42 to the primary roller 40. In both of FIGS. 7B and 7C, the tape climbing when moving from one roller to another requires that the read/write head unit 26 (not shown in FIGS. 7A-7C) adjust its position in order to follow the tape data tracks. This complicates the job of the tape drive servo actuation system and increases the likelihood that transducing errors will occur.

Figure 8:
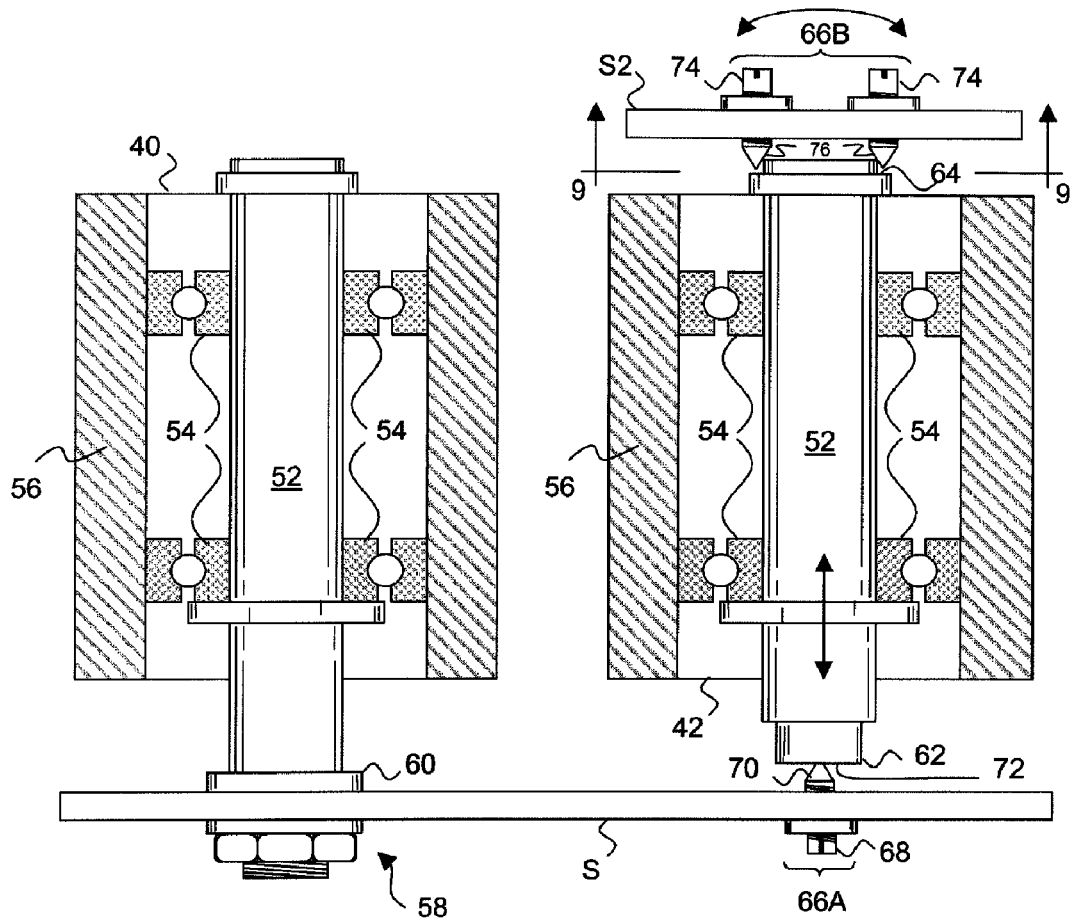
FIG. 8 is a side elevational view showing a pair of conjugated primary guide rollers, with one of the rollers having a precision alignment system.

Turning now to FIG. 8, a tape path control system and related method for controlling the position of the tape medium 28 in the tape drive 10 will now be described. FIG. 8 represents an enlarged view of the primary rollers 40 and 42 shown in FIGS. 5 and 6. Both rollers 40 and 42 include a central bearing shaft 52 whose centerline defines the rotational axis of each roller. A pair of roller bearings 54 are mounted on each bearing shaft to support a roller element 56. As described above, the roller elements 56 may each have a suitable tape bearing surface configuration in accordance with conventional roller designs.

The primary roller 40 is fixedly mounted to a common reference structure "S," as by using a nut and washer mounting arrangement 58 secured to the precision-machined base end 60 of the bearing shaft 52, which is threaded. In contrast, the bearing shaft 52 of the primary roller 42 has a pivotal base end 62 and a free terminal end 64. Moreover, the entire primary roller 42 is mounted in place by way of a precision alignment system, an exemplary embodiment of which is shown by reference numerals 66A/66B. When operable, the precision alignment system 66A/66B allows the primary roller 42 to be adjustably aligned relative to the primary roller 42 in order to control lateral tape movement when the tape medium 28 streams across the rollers in operative engagement with the transducing head 26 (not shown in FIG. 8).

The precision alignment system 66A/66B of the illustrated embodiment includes an axial adjustment control 66A adapted to adjust the position of the primary roller 42 along its rotational axis. The axial adjustment control 66A includes a set screw 68 that is adjustably threaded or otherwise adjustably mounted relative to the fixed reference structure "S." The set screw 68 is axially aligned with the bearing shaft 52 on the primary roller 42 and has a pivot point 70 that engages the base end face 72 of the bearing shaft. Although not shown, the base end face 72 has a concave dimple to receive and retain the pivot point 70. Alternatively, the pivot point 70 may be a ball, in which case the dimple receives and retains the ball. It will be seen that by rotating the set screw 68, the primary roller 42 can be raised or lowered relative to the reference surface "S."

The precision alignment system 66A/66B further includes a tilt angle adjustment control 66B adapted to adjust the tilt angle of the primary roller 42. The tilt angle adjustment control 66B engages the free terminal end 64 of the bearing shaft 52 by way of three set screws 74 (two of which are shown in FIG. 8). The set screws 74 are adjustably threaded or otherwise adjustably mounted relative to a fixed reference structure "S2," with the set screws being aligned to engage a side portion of the bearing shaft 52. More particularly, the set screws 74 extend parallel to the bearing shaft 52, and include tapered ends 76 that adjustably engage the side of the bearing shaft according to a set screw threaded advancement position. It will be seen that by rotating the set screws 74, different surface portions of the tapered ends 76 will engage the bearing shaft 52, causing its free terminal end 64 to translate relative to the reference surface "S2." This translation will cause the primary roller 42 to tilt about the pivot point 70 on the lower set screw 68.

Figure 9A:
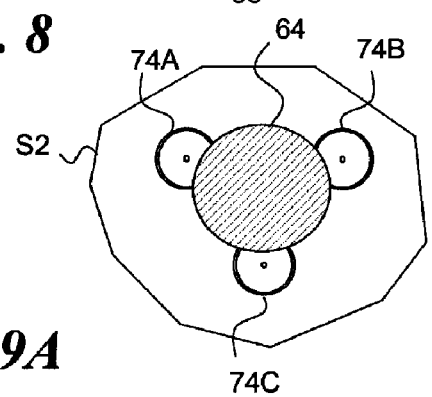
FIGS. 9A, 9B and 9C are cross-sectional views taken along ling 9-9 in FIG. 8 showing several conjugated roller adjustment positions.
Figure 9C:
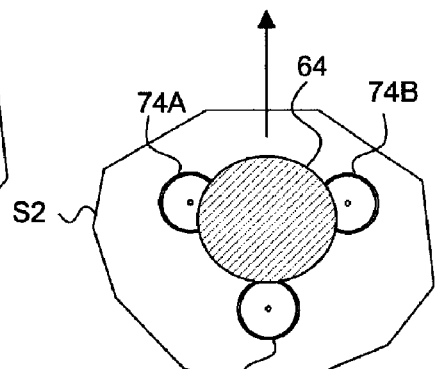
Figure 9B:
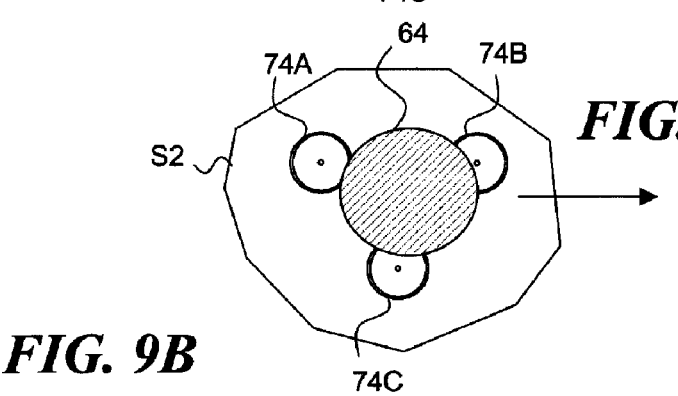

FIGS. 9A, 9B and 9C illustrate this adjustment. FIG. 9A represents a baseline adjustment position wherein all the set screws 74 are adjusted so that the bearing shaft 55 of the primary roller 42 is centered between the set screws 74A, 74B and 74C. FIG. 9B represents another adjustment position wherein the set screw 74A is advanced toward the reader and the set screws 74B and 74C are retracted away from the reader. This causes the bearing shaft's free terminal end 64 to move in the direction of the arrow shown in FIG. 9B. FIG. 9C represents another adjustment position wherein the set screw 74C is advanced toward the reader and the set screws 74A and 74B are retracted away from the reader. This causes the bearing shaft's terminal end 64 to move in the direction of the arrow shown in FIG. 9C.

According to the disclosed method, the precision alignment system 66A/66B is operated to align the primary roller 42 relative to the primary roller 40 in order to control lateral tape movement when the tape medium 28 streams across the rollers in operative engagement with the read/write head unit 26. The adjustments can be made by observing the running tape or by precision optical measurements, or both. Once the required adjustments are made and the desired roller orientation has been achieved, the precision alignment system 66A/66B may be permanently fixed in the alignment position, as by applying a potting compound to the set screws 66 and 74 to lock their position. Alternatively, the adjustment could be dynamically updated by using servo control units to manipulate the set screws 68 and 74.

Figure 10:
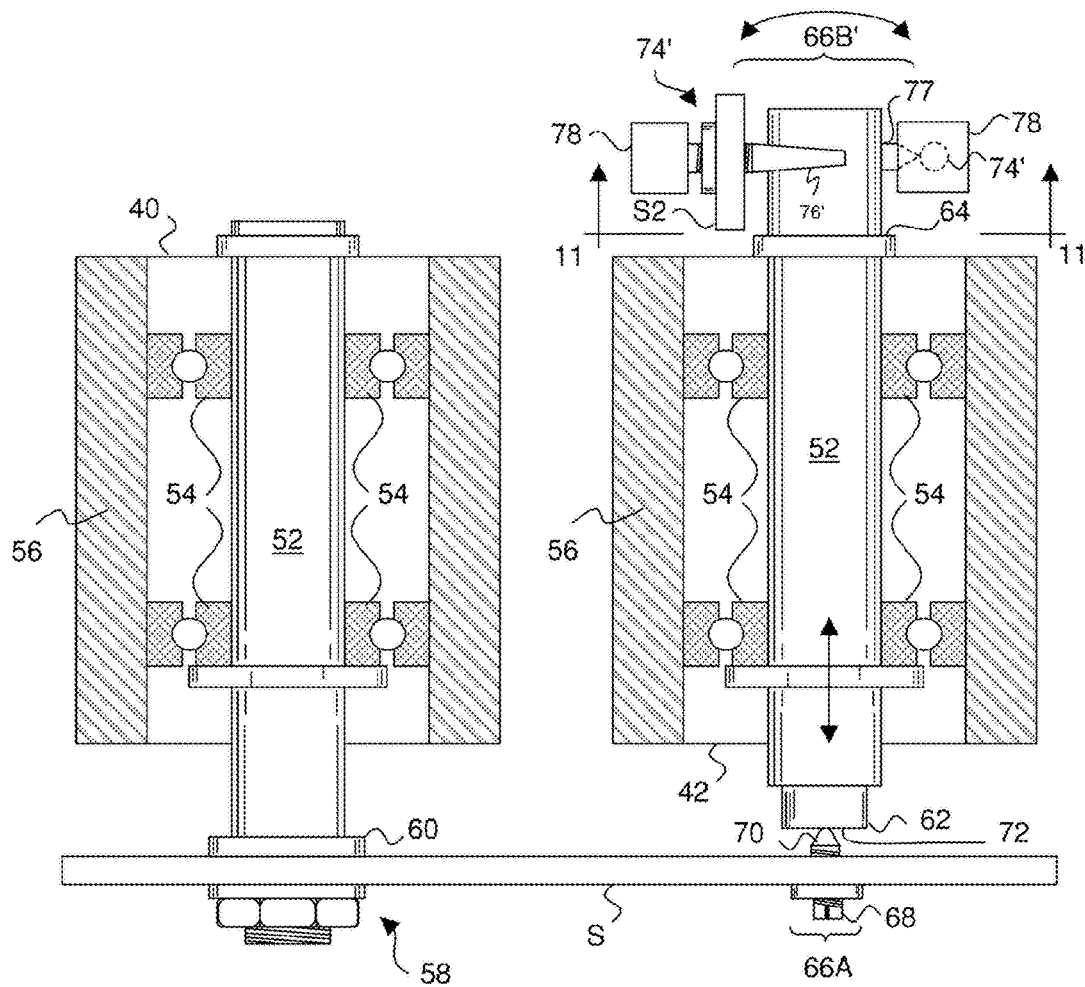
FIG. 10 is a side elevational view showing a pair of conjugated primary guide rollers, with one of the rollers having an alternative precision alignment system.
Figure 11:
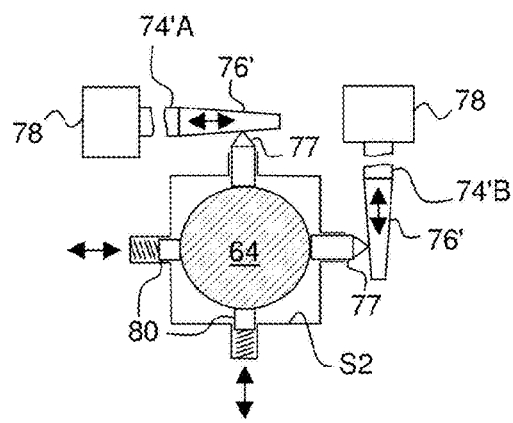
FIG. 11 is a cross-sectional views taken along ling 11-11 in FIG. 10.

FIGS. 10 and 11 illustrate the concept of dynamic adjustment in another embodiment wherein an alternative tilt angle adjustment control 66B' is used in a precision alignment system 66A/66B'. The tilt angle adjustment control 66B' engages the free terminal end 64 of the bearing shaft 52 by way of two set screws 74' oriented at 90° relative to each other. The set screws 74' are adjustably threaded or otherwise adjustably mounted relative to a fixed reference structure "S2" (shown in connection with the left-hand set screw only), with the set screws being aligned to engage a side portion of the bearing shaft 52. More particularly, the set screws 74' extend perpendicular to the bearing shaft 52, and include tapered ends 76' that adjustably engage a pair of shaft adjustment pins 77 that are supported for slideable movement by the fixed reference structure "S2." The shaft adjustment pins 77 have pointed ends that engage the set screw tapered ends 76' and flat ends that engage the side of the bearing shaft 52. The base end of each set screw 74' is operatively coupled to a servo unit 78 that is adapted to rotate the set screw in either direction in response to external servo control signals (not shown). Note that the servo units 78 could be mounted to the fixed reference structure "S2" rather than the set screws 74'. Moreover, instead of rotating the set screws 74', the servo units 78 could be adapted to simply axially advance and retract the set screws (which need not be threaded in this configuration). As shown in FIG. 11, a pair of spring loaded pins 80 are supported by the fixed reference structure "S2" in order to stabilize the bearing shaft 52 against the forces imparted by the shaft adjustment pins 77. It will be seen that by adjusting the set screws 74', different surface portions of the tapered ends 76' will engage the shaft adjustment pins 77, causing the pins to advance or retract and thereby translate the bearing shaft's free terminal end 64 relative to the reference surface "S2." This translation will cause the primary roller 42 to tilt about the pivot point 70 on the lower set screw 68.

Figure 12:
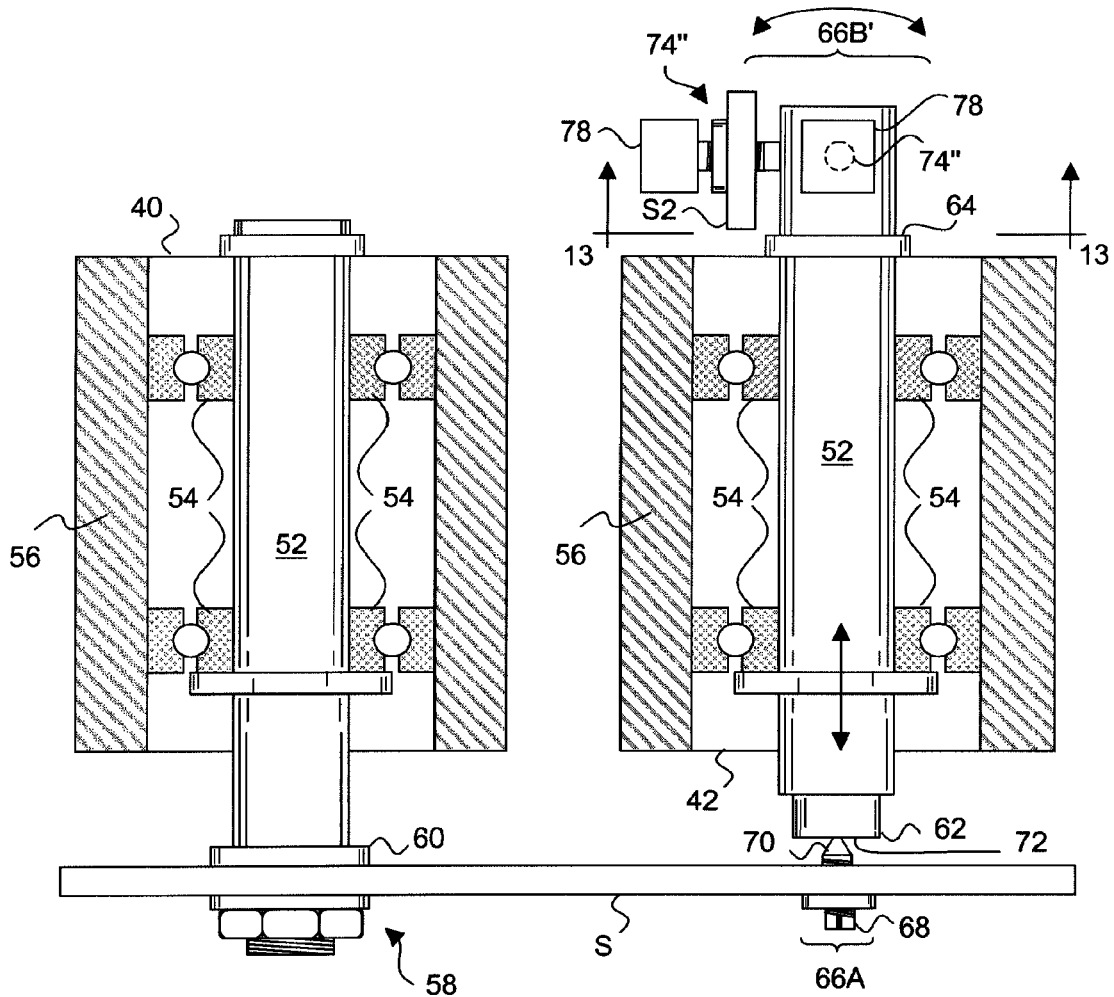
FIG. 12 is a side elevational view showing a pair of conjugated primary guide rollers, with one of the rollers having another alternative precision alignment system.
Figure 13:
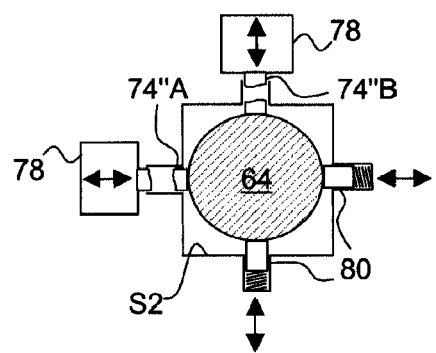
FIG. 13 is a cross-sectional views taken along ling 13-13 in FIG. 12.

FIGS. 12 and 13 illustrate a further embodiment wherein another alternative tilt angle adjustment control 66B" is used in a precision alignment system 66A/66B". The tilt angle adjustment control 66B" is identical in most respects to the tilt angle adjustment control 66B' shown in FIGS. 10 and 11. The only difference is that the ends of the set screws 74" are flat and engage the bearing shaft free terminal end 64 head-on rather than by way of tapered surfaces. As shown in FIG. 13, the spring loaded pins 80 are supported by the fixed reference structure "S2" in order to stabilize the bearing shaft 52 against the forces imparted by the flat ends of the set screws 74". It will be seen that by adjusting the set screws 74", the flat ends thereof will change the position of the bearing shaft 52, causing the free terminal end 64 thereof to translate relative to the reference surface "S2." This translation will cause the primary roller 42 to tilt about the pivot point 70 on the lower set screw 68.

Accordingly, a system and method have been disclosed for controlling a tape path during operation of a tape drive data storage system using conjugated rollers. While various embodiments of the invention have been shown and described, it should be apparent that many variations and alternative embodiments could be implemented in accordance with the teachings herein. For example, although various alternative embodiments of a precision alignment system were disclosed, it will be appreciated that many other mechanisms could be used to provide the desired axial and tilt angle adjustments of the roller 42, and thus function as a precision alignment system. It is understood, therefore, that the invention is not to be in any way limited except in accordance with the spirit of the appended claims and their equivalents.

What is claimed is:

1. In a tape drive, a tape path control system for controlling the position of a tape medium in said tape drive comprising:
a first tape guide roller;
a second tape guide roller spaced from said first roller;
each of said rollers having a tape bearing surface;
said rollers each being rotatable about a roller axis at a roller angular velocity and having a roller diameter that extends through said axis from one point to another on said tape bearing surface of said rollers;
a transducing head situated between said first and second rollers;
a precision alignment system associated with said second roller that when operable allows said second roller to be adjustably aligned relative to said first roller in order to control lateral tape movement when a tape medium streams across said rollers in operative engagement with said transducing head;
said first and second rollers being configured and arranged to further control said lateral tape movement by sizing said roller diameters to achieve a desired minimizing of said roller angular velocity and a desired maximizing of a tape contact area on said tape bearing surface of said rollers, and by spacing said rollers to establish a minimum achievable tape span distance therebetween, even if said rollers are nearly adjacent to each other, but without said rollers contacting each other or interfering with said transducing head or other components;
said second roller being spaced from said first roller at a roller diameter/center-to-center spacing ratio of approximately 1:1 while still accommodating said transducing head therebetween and without said rollers contacting each other; and
said transducing head being positioned to lie on an opposite side of said tape medium from said first and second rollers.

2. A tape drive in accordance with claim 1 wherein said precision alignment system comprises an axial adjustment control adapted to adjust a position of said second roller along an axis thereof.

3. A tape drive in accordance with claim 2 wherein said axial adjustment control comprises a set screw adjustably mounted relative to a fixed reference structure, said set screw being axially aligned with a bearing shaft on said second roller and engaging an end face of said bearing shaft, such that said second roller is tiltable about said set screw.

4. A tape drive in accordance with claim 1 wherein said precision alignment system comprises a tilt angle adjustment control adapted to adjust a tilt angle of said second roller.

5. A tape drive in accordance with claim 4 wherein said tilt angle adjustment control comprises one or more set screws adjustably mounted relative to a fixed reference structure, said set screw(s) being aligned to engage a side portion of a bearing shaft on said second roller at a free terminal end thereof, with a base end of said bearing shaft being pivotally mounted.

6. A tape drive in accordance with claim 5 wherein said one or more set screws extend parallel or perpendicular to said bearing shaft and include tapered or flat ends that adjustably engages a side of said bearing shaft according to a set screw advancement position.

7. A tape drive in accordance with claim 1 further wherein said precision alignment system is permanently fixed in an alignment position.

8. A tape drive in accordance with claim 7 wherein said precision alignment system comprises a potting compound that permanently fixes said precision alignment system.

9. A method for controlling the position of a tape medium in a tape path during operation of a tape drive comprising:
providing a first tape guide roller;
providing a second tape guide roller spaced from said first roller;
each of said rollers having a tape bearing surface;
said rollers each being rotatable about a roller axis at a roller angular velocity and having a roller diameter that extends through said axis from one point to another on said tape bearing surface of said rollers;
providing a transducing head situated between said first and second rollers;
adjustably aligning said second roller relative to said first roller in order to control lateral tape movement when a tape medium streams across said rollers in operative engagement with said transducing head;
said first and second rollers being configured and arranged to further control said lateral tape movement by sizing said roller diameters to achieve a desired minimizing of said roller angular velocity and a desired maximizing of a tape contact area on said tape bearing surface of said rollers, and by spacing said rollers to establish a minimum achievable tape span distance therebetween, even if said rollers are nearly adjacent to each other, but without said rollers contacting each other or interfering with said transducing head or other components;
said second roller being spaced from said first roller at a roller diameter/center-to-center spacing ratio of approximately 1:1 while still accommodating said transducing head therebetween and without said rollers contacting each other; and
said transducing head being positioned to lie on an opposite side of said tape medium from said first and second rollers.

10. A method in accordance with claim 9 wherein said second roller comprises a pivotal base end and a free terminal end, and said aligning is performed by a precision alignment system comprising an axial adjustment control that is operated to adjust a position of said second roller along an axis thereof, said axial adjustment control pivotally engaging said pivotal base end such that second roller is tiltable about said base end.

11. A method in accordance with claim 10 wherein said axial adjustment control comprises a set screw adjustably mounted relative to a fixed reference structure, said set screw being axially aligned with a bearing shaft on said second roller and engaging an end face of said bearing shaft, and wherein said set screw is adapted to be advanced or retracted to adjust an axial position of said second roller.

12. A method in accordance with claim 9 wherein said second roller comprises a pivotal base end and a free terminal end, such that said second roller is tiltable about said pivotal base end, and said aligning is performed by a precision alignment system comprising a tilt angle adjustment control that is operated to adjust a tilt angle of said second roller, said tilt angle adjustment control engaging said free terminal end.

13. A method tape in accordance with claim 12 wherein said tilt angle adjustment control comprises one or more set screws adjustably mounted relative to a fixed reference structure and aligned to engage a side portion of said second roller free terminal end, and wherein said one or more set screws are adapted to be advanced or retracted to adjust said tilt angle of said second roller.

14. A method in accordance with claim 13 wherein said one or more set screws extend parallel or perpendicular to a bearing shaft on said second roller and comprise tapered or flat ends that adjustably engages a side of said bearing shaft according to a set screw advancement position.

15. A method in accordance with claim 9 wherein said precision alignment system comprises a potting compound that permanently fixes said precision alignment system.

16. In a tape drive, a tape path control system for controlling the position of a tape medium in said tape drive comprising:

a first tape guide roller;

a second tape guide roller spaced from said first roller at a roller diameter/center-to-center spacing ratio of approximately 1:1;

said roller diameter being a dimension on said rollers that extends through a central roller axis from one point to another on a tape bearing surface of said rollers;

a transducing head situated between said first and second rollers;

said transducing head being positioned to lie on an opposite side of a tape medium from said first and second guide rollers; and a precision alignment system associated with said second roller that when operable allows said second roller to be adjustably aligned relative to said first roller in order to control lateral tape movement when said tape medium streams across said rollers in operative engagement with said transducing head.

* * * * *